(12) United States Patent
Omi

(10) Patent No.: US 7,946,744 B2
(45) Date of Patent: May 24, 2011

(54) PROJECTOR AND IMAGE PICKUP APPARATUS

(75) Inventor: Takuhiro Omi, Anjo (JP)

(73) Assignee: DENSO CORPORATION, Kariya (JP)

( * ) Notice: Subject to any disclaimer, the term of this patent is extended or adjusted under 35 U.S.C. 154(b) by 216 days.

(21) Appl. No.: 12/068,022

(22) Filed: Jan. 31, 2008

(65) Prior Publication Data

US 2008/0186701 A1 Aug. 7, 2008

(30) Foreign Application Priority Data

Feb. 2, 2007 (JP) ................................. 2007-024340

(51) Int. Cl.
F21S 21/00 (2006.01)
(52) U.S. Cl. ........ 362/545; 362/470; 362/481; 362/490; 362/501; 362/511
(58) Field of Classification Search .................. 362/545, 362/470, 471, 477, 478, 481, 482, 485, 488, 362/490, 492, 494, 495, 501, 503, 511, 540, 362/548; 348/370; 353/13, 14, 94
See application file for complete search history.

(56) References Cited

U.S. PATENT DOCUMENTS

| | | | |
|---|---|---|---|
| 5,598,145 A | 1/1997 | Shimotani et al. | |
| 6,302,551 B1 * | 10/2001 | Matumoto | 362/27 |
| 6,683,423 B2 | 1/2004 | Cunningham | |
| 6,882,741 B2 | 4/2005 | Dobashi et al. | |
| 6,909,377 B2 | 6/2005 | Eberl | |
| 6,952,498 B2 * | 10/2005 | Ishikura | 382/190 |
| 7,478,925 B2 * | 1/2009 | Hiyama et al. | 257/E25.02 |
| 2003/0136895 A1 * | 7/2003 | Ogawa | 250/205 |
| 2005/0226472 A1 | 10/2005 | Komura | |
| 2006/0018641 A1 | 1/2006 | Goto et al. | |
| 2006/0091779 A1 | 5/2006 | Takeda et al. | |
| 2007/0183163 A1 * | 8/2007 | Daniel | 362/489 |
| 2007/0239992 A1 | 10/2007 | White et al. | |
| 2008/0084499 A1 * | 4/2008 | Kisacanin et al. | 348/370 |

FOREIGN PATENT DOCUMENTS

| | | |
|---|---|---|
| JP | A-6-189166 | 7/1994 |
| JP | A-6-233306 | 8/1994 |
| JP | A-7-156712 | 6/1995 |
| JP | A-2001-18717 | 1/2001 |
| JP | A-2001-194161 | 7/2001 |
| JP | A-2006-193120 | 7/2006 |
| JP | A-2006-248365 | 9/2006 |

OTHER PUBLICATIONS

Office Action dated Jun. 5, 2009 from the China Patent Office in the corresponding CN Application No. 2008100086242 (and English Translation).
Office Action issued from the German Patent Office on Mar. 22, 2010 in the corresponding German patent application No. 10 2008 006 973.6-53 (English translation thereof).

\* cited by examiner

Primary Examiner — Jong-Suk (James) Lee
Assistant Examiner — Mark Tsidulko
(74) Attorney, Agent, or Firm — Posz Law Group, PLC

(57) ABSTRACT

Light generated at a specific wavelength corresponding to a particular color or color range that is distracting or disruptive to a driver during a normal operation is blocked through an inexpensive construction without blocking light in a required range of wavelengths. A projector is constructed such that a plurality of LEDs are arranged in an array configuration. The LEDs can include a tinge of red reduction LED and near-infrared LEDs. The projector can be installed in a vehicle and disposed in proximity to the camera. In some embodiments, the projector can be controlled by a control circuit to be turned on in conjunction with the shutter of a camera.

18 Claims, 6 Drawing Sheets

SINGLE INFRARED LED

DIRECTIONAL PATTERN

PROJECTOR AND IMAGE PICKUP APPARATUS

CROSS REFERENCE TO RELATED APPLICATIONS

The present invention is based on and claims priority to Unpublished Japanese Patent Application No. 2007-024340 the entire contents of which are incorporated herein by reference.

BACKGROUND OF THE INVENTION

1. Field of the Invention

The present invention is related to light blocking and more particularly to blocking light generated at a specific wavelength corresponding to a particular color or color range that is distracting or disruptive to a driver during a normal operation by use of an inexpensive construction while avoiding blocking light in a range of wavelengths that are important for human visual acuity.

2. Description of the Related Art

Conventionally known image pickup devices can include, for example, a projector that is installed in proximity to an instrument cluster in a vehicle compartment. The projector projects light including near-infrared wavelength light towards the face of a driver. A camera similarly installed in proximity to the instrument cluster picks up reflected light obtained when the projected light is reflected by the face of the driver.

Conventional image pickup devices can be configured to detect an unstable state of the driver, such as a sleepy or inattentive state, using a sensing means for detecting characteristics of facial images such as closed eyes, and the like. Since such devices must stably pick up the image of a face any time day or night, light, including near-infrared light, can be projected from the projector to the face of the driver forming a reference light level.

Some conventional image pickup devices can be constructed as follows to prevent a human from becoming aware of being an object of image pickup. The devices can include a projector, an image pickup means for picking up images using an electromagnetic wave in a wavelength range to which humans are insensitive, and a visible light blocking means that lets though electromagnetic waves in the wavelength range to which humans are insensitive, while blocking visible light. The visible light blocking means is installed in the light path between the image pickup means and a human so that the image pickup means is invisible to the human. Some conventional image pickup devices further include an illuminating means for illuminating the object of image pickup with an electromagnetic wave in a wavelength range to which humans are insensitive to light such as is described, for example in JP-A-6-189166. A concrete example of a conventional projector near-infrared light source includes a light emitting diode (LED) and the like. It should further be noted that LEDs have not only a single wavelength but also a range of wavelengths having a certain width.

Some of these image pickup devices are enhanced in sensitivity on the long wavelength side through use of an image pickup device having high sensitivity to a near-infrared wavelength. Examples of such devices are described, for example, in JP-A-6-233306, JP-A-2001-018717, and JP-A-2001-194161.

Since the amount of light of one LED is usually insufficient to favorably pick up images, some of the conventional projectors are so constructed that LEDs can be arranged in an array configuration on a circuit board. Thus, a brightness sufficient for a camera to pick up a desired image is obtained, and the near-infrared light is broadened so that, for example, a human face can be evenly illuminated. In such a conventional device, LEDs may be configured or caused to continuously emit light. However, "continuously" emitting LEDs are usually caused to emit light in a pulsed manner in synchronization, for example, with the shutter speed of a camera so as to lengthen the lives of the LEDs and reduce current consumption in the LED.

It should be noted however, that conventional devices, such as the image pickup device described in JP-A-6-189166 suffer limitations. For example, as described above, LEDs associated with conventional projectors have a single wavelength and a range of wavelengths having a certain width. Consequently, when an inexpensive visible light blocking means completely blocks visible wavelengths, it also blocks light in a range of visible wavelengths required for visibility. The above-mentioned visible light blocking means could be constructed of a filter that can completely block visible wavelengths, however an expensive multilayer film is required, rendering the approach economically impractical.

Long-wavelength LEDs have low sensitivity within the range in which the image pickup device is used, resulting in degraded efficiency. As descried in documents JP-A-6-233306, JP-A-2001-018717 and JP-A-2001-194161, while an image pickup device having high sensitivity in a near-infrared range can be used enhance sensitivity on the long wavelength side, such an image pickup device is expensive, rendering yet another approach economically impractical.

SUMMARY OF THE INVENTION

The invention has been made in consideration of the above problems. Therefore it is an object of the invention to produce a device having an inexpensive construction and capable of blocking light generated, typically from a luminescent source, at a specific wavelength corresponding to a particular color or color range that is distracting or that would be disruptive to a driver during a normal operation without blocking light in a required range of wavelengths. The light can also be generated from an incandescent source as will be described.

The disruptive or distracting light can be characterized as a color, a range of colors or a mixture of colors, or the like, that, along with a particular intensity, gives a meaningless message or confusing message that could hinder an operation of a vehicle and generally create a force that works against a driver, who would normally operate a vehicle with a clear and wakeful consciousness and a reasonable level of stress. For example, red color is generally used for warning of an emergency message to the driver. Therefore, it is confusing for the driver when being regularly projected with red color from a light source.

An exemplary projector can include multiple light sources different in wavelength disposed in a vehicle compartment in such positions that light projected from the multiple light sources are mixed together before they reach the driver's eyes.

A near-infrared projector so constructed whose wavelength is close to that of visible light, can be used to, for example, reduce a red tinge when light of any other waveform is mixed, thus making the red color invisible. Thus, confusion can be avoided for a driver who is susceptible to red color. Therefore, it is possible to block light generated from a source at a specific wavelength corresponding to a particular color or color range that is distractive, as described above.

It should be noted that different light sources associated with at least two different wavelengths can be mixed and the following measures can be taken in accordance with various exemplary embodiments. A light source of one wavelength can be constructed of an LED, while a light source of the other wavelength can be constructed of a light emitter other than LED. Examples of light emitters other than LED can include, for example, an electro luminescent (EL) device in the form of planar light emitter, an electric or incandescent light bulbs, physical constructions that reflect environment light, and the like. A variety of light sources makes it possible to select a more appropriate combination based on the frequency characteristics of the LEDs and the alternative light source taken into account.

Using light sources of two different wavelengths, a device having the following operational characteristics can be implemented. In accordance with various exemplary embodiments, a light source of one wavelength can project light containing visible red light. It should be noted however that it possible to give the driver a feeling of tension arising from awareness that he or she is being monitored by projecting the visible light. It should be noted that the red color that attracts attention to the driver and therefore can contribute to the enhancement of preventive safety.

The above-mentioned multiple light sources can be disposed in the instrument panel of a vehicle making it possible to project light from each of the above-mentioned light sources to the driver's face substantially squarely, and to evenly illuminate the face with light when picking up its image with the camera.

It should be noted that a reflecting member that can reflect light can be disposed in the light path of light projected from any of the above-mentioned multiple light sources making it possible to enhance the degree of freedom in design for disposing the components of the projector in the vehicle compartment. Thus, the degree of freedom in location of the light source can be enhanced. In addition, the reflecting member is capable of selectively reflecting and absorbing a specific component of wavelength of the light projected from the light source, whereas red component can be reduced from the light projected to the driver. Similarly, red component can be reduced from natural light by selectively reflecting and absorbing specific component of wavelength of the light by using the reflecting member.

For example, some of the above-mentioned projector can be provided with a controlling means for controlling the respective the amount of light emitted through the above-mentioned multiple light sources making it possible to appropriately control the output of each light source.

In accordance with the above described and other embodiments, the amounts of currents passed through the individual multiple light sources can be controlled. The controlling means can control the amount of light emitted through the individual multiple light sources according to outside light illuminance making it possible to appropriately control the output of each light source. The result is that the illuminance of each light source felt by the driver is varied depending on the outside light illuminance.

The controlling means can further control the control value through the multiple light sources according to ambient temperature making it possible to appropriately control the output of each light source. The result is that the output level of each light source is varied depending on the ambient temperature.

The controlling means can further control the control value through the multiple light sources according to systematic changes in the projector making it possible to appropriately control the output of each light source. The result is that the output level of each light source is varied due to systematic change in the projector.

The controlling means can still further control the amounts of currents passed through the multiple light sources on a light source-by-light source basis For example, a light source capable of projecting light containing visible red light and a light source capable of projecting visible green light are included in the above-mentioned multiple light sources. Output control is carried out so that the output of the green light is higher than the output of the red light. The suppression of the red light occurs due to the phenomenon whereby light simultaneously reaching a human eye will be discriminated based on intensity. In other words, a driver will become more vividly aware of whichever color of light has a more intense output and will pay less attention to the weaker color making it possible to more effectively block distracting light through an inexpensive construction and without blocking light in a range of wavelengths that is required for driver vision.

The controlling means can still further control the control value through the multiple light sources on a light source-by-light source basis according, for example, to a condition of the vehicle driver and thereby adjust the state of the above mentioned color mixture making it possible to bring to the driver's attention conditions such as drowsiness that are difficult to become aware of. Further, it is possible to alert the driver by change in the state of color mixture.

It should be noted that light sources of two different wavelengths associated with, for example, the above-mentioned multiple light sources can be constructed as follows.

The light sources of two different wavelengths of the above-mentioned multiple light sources in accordance with the present and various embodiments, can be constructed according to following exemplary implementation. One light source can project a near-infrared ray including visible light. A controlling means can control the control value through the multiple light sources on a light source-by-light source basis and can carry out control so that the amount of light emitted from the other light source is larger at startup. A projector can be so constructed that multiple light sources are disposed in a vehicle compartment in such positions that light projected from the multiple light sources different in wavelength are mixed together before they reach the driver's eyes. The projector includes a controlling means for controlling the amounts of currents passed through the multiple light sources on a light source-by-light source basis. Light sources of two different wavelengths of the multiple light sources are so constructed that a light source of one wavelength can project a near-infrared ray including visible light. The controlling means carries out control so that the amount of light emitted from a light source of the other wavelength is larger at startup.

For example, when a light source capable of projecting light containing visible red light and a light source capable of projecting light containing visible green light are included in the above-mentioned multiple light sources, output control can be carried out so that the output of the green light is higher than the output of the red light in terms of visibility to the driver. When light from both sources simultaneously reach a human eye, the color whose output is more intense becomes more apparent. Therefore, the driver pays less attention to the weaker color.

The exemplary light sources of two different wavelengths described above in connection with the multiple light sources can be so constructed that one light source can project a near-infrared ray including visible light and the amount of light emitted from the other light source at startup is preset higher. For example, a projector can be so constructed that multiple light sources different in wavelength are disposed in a vehicle compartment in such positions that light projected from the multiple light sources are mixed together before they reach the driver. The projector can include a controlling means for controlling the control value through the multiple light sources on a light source-by-light source basis. In particular, the controlling means controls the amount of a current passed through the light source of the other wavelength according to the preset amount of emitted light that is desired.

When a light source capable of projecting visible red light and a light source capable of projecting visible green light are included in the above-mentioned device having multiple light sources output control is carried out so that the output of the green light is higher than the output of the red light. As noted, when light from two sources simultaneously reach a human eye, more awareness is given to the source whose output is more intense. Therefore, less attention is paid to the weaker source particularly from the early stages immediately after startup.

A device as described above with light sources of two different wavelengths can be so constructed that one light source can project a near-infrared ray including visible light and a controlling means can control the amount of current passed through each of the multiple light sources on a light source-by-light source basis. The control means can carry out control so that the amount of a current passed through the other light source is increased after startup. For example, a projector can be so constructed that multiple light sources different in wavelength are disposed in a vehicle compartment in such positions that light projected from the multiple light sources are mixed together before they reach the driver. The projector can include the controlling means. A light source of one wavelength can project a near-infrared ray including visible light. The controlling means controls the amount of a current passed through a light source of the other wavelength so that it is increased after the projector is started.

Accordingly, for example, when a light source capable of projecting light containing visible red light and a light source capable of projecting light containing visible green light are included in the above-mentioned multiple light sources, output control is carried out so that the output of the green light is higher than the output of the red light. As noted, an observer will pay more attention to the intense light and less attention to the weaker light.

In accordance with still another exemplary embodiment, the above-mentioned multiple light sources can be so constructed that their output levels can be manually adjusted. Specifically, the exemplary projector is provided with an inputting means that can be used to input a change in the respective amounts of currents passed through the multiple light sources on a light source-by-light source basis. A controlling means adjusts the amounts of currents passed through the multiple light sources on a light source-by-light source basis based on the amount of change inputted by the inputting means. Accordingly, the convenience of the driver or user can be enhanced.

Still further, the invention can be embodied as an image pickup apparatus. Specifically, the image pickup apparatus can include any of the above described exemplary projectors and a camera that picks up light projected by the projector being reflected by a face of the driver.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

Hereafter, description will be given to embodiments of the invention with reference to the drawings.

First Embodiment

Figure 1A:
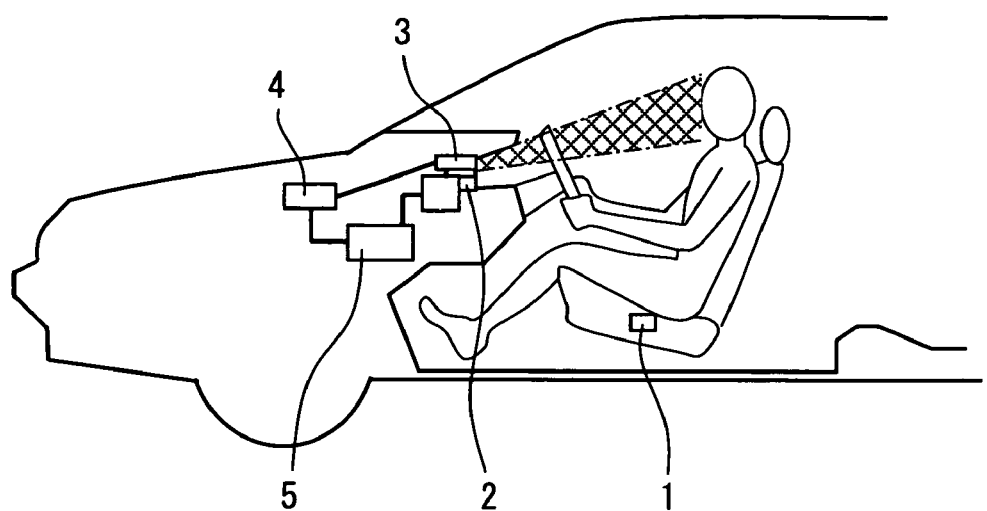
FIG. 1A is a diagram illustrating an exemplary configuration of an image pickup apparatus in accordance with a first embodiment.
Figure 1B:
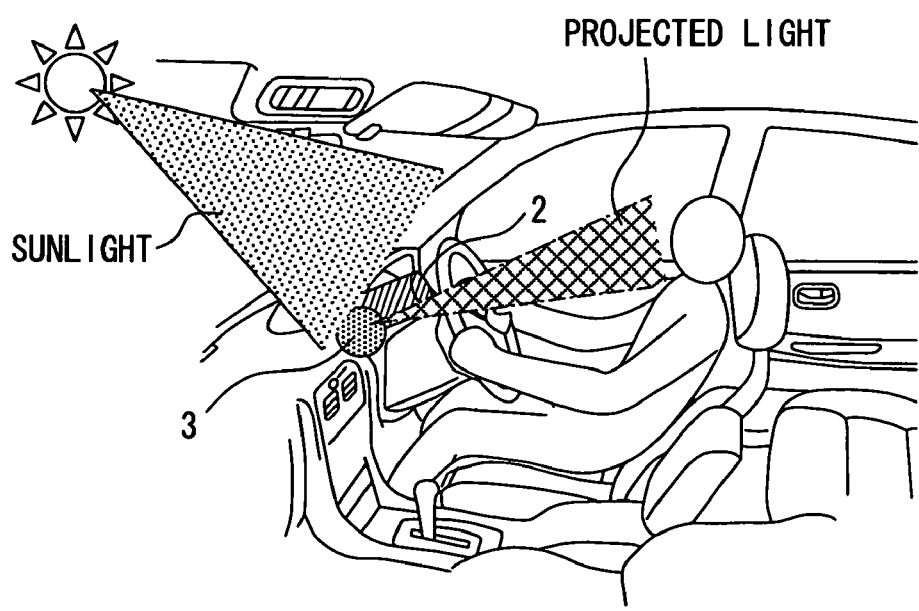
FIG. 1B is a diagram illustrating the interior of a vehicle compartment.
Figure 2:
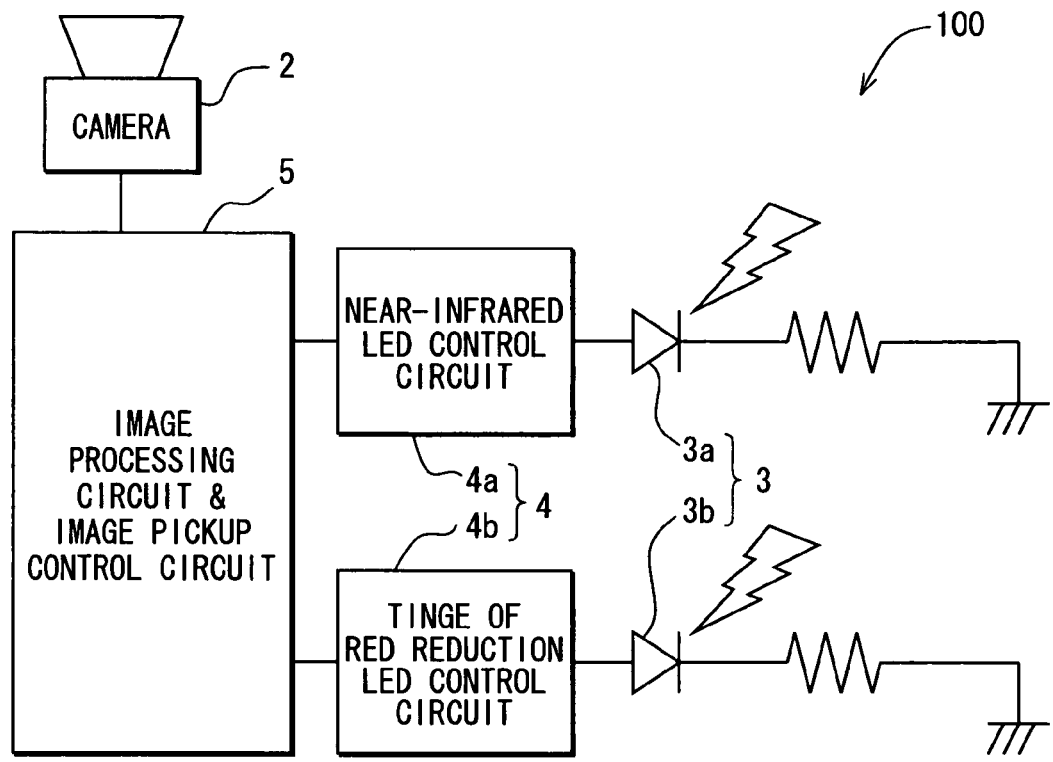
FIG. 2 is a block diagram illustrating the configuration of an image pickup apparatus in accordance with the first embodiment.

An image pickup apparatus 100, shown in FIG. 2 can be described as a system for carrying out functions such as, for example, personal authentication and closed eyes detection. As can be seen from FIG. 1 individual components of the image pickup apparatus 100 can be located in a vehicle and can include, for example, a weight sensing switch 1, a camera 2, a projector 3 functioning as a light source, a LED control circuit 4, and an image processing circuit 5 functioning as a controlling means.

The weight sensing switch 1 senses the presence of a driver and can be built in the seating face of a driver's seat. The weight sensing switch 1 is configured to output a signal indicating that to the image processing circuit 5 when it senses the presence of a driver through various means such as a change in a capacitive signal or the like.

A camera 2 can be provided for picking up the image of, for example, the face of a driver sitting on the driver's seat. For facial image pick up, a near-infrared camera can be used as the camera 2. The camera 2 is disposed in such a position in the vehicle compartment that it can pick up the image of the face of a driver when the driver is sitting in the driver seat. As illustrated in FIG. 1, specifically, the camera 2 is installed in the instrument panel, which can be located for example, in the vehicle dashboard. The camera 2 can be inconspicuously positioned in the recesses of the instrument panel.

For example, the camera 2 can be installed in proximity to a face air outlet of an air conditioner, which is positioned in the center of the dashboard. However, a position directly in front of the driver seat is preferable to the center of the dashboard since the camera must be installed in a position where the face of the driver can be squarely shot. An example of such a position is the instrument panel in the dashboard. The camera 2 is configured to be actuated when it receives an actuation instruction signal from the image processing circuit 5 and output the acquired image of the driver's face to the image processing circuit.

Figure 4A:
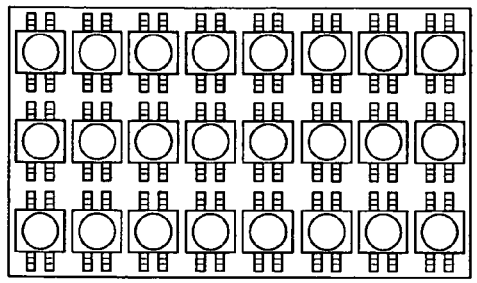
FIG. 4A is a diagram illustrating a disposition of an exemplary array of LEDs in a projector.
Figure 4B:
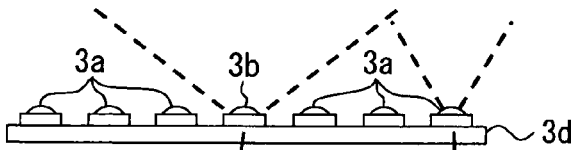
FIG. 4B is a diagram illustrating an exemplary disposition of near-infrared LEDs and a tinge of red reduction LED in a projector.
Figure 4C:
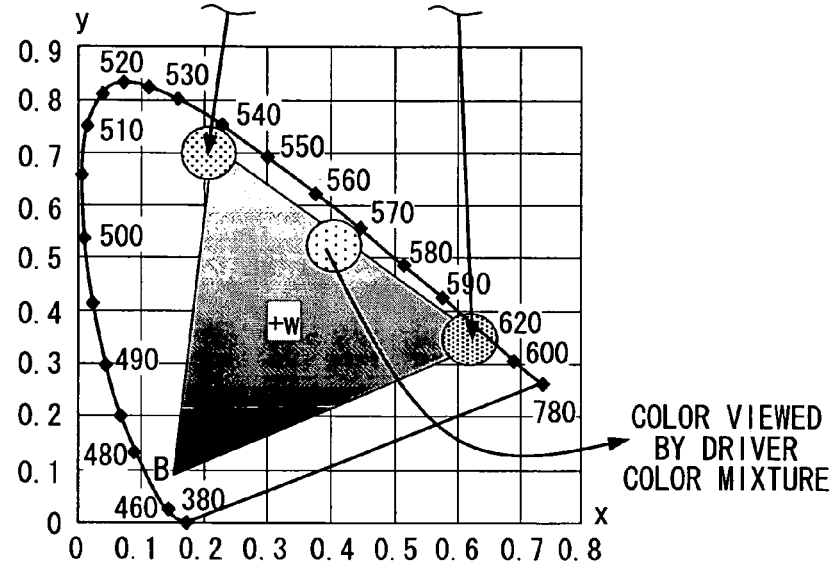
FIG. 4C is a graph illustrating the exemplary composition of a light mixture projected by a projector.
Figure 4D:
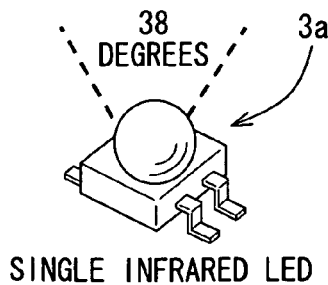
FIG. 4D is a diagram illustrating an exemplary single infrared LED with a 38 degree field in an exemplary projector.
Figure 4E:
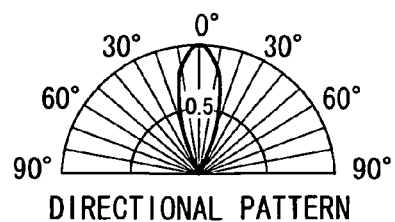
FIG. 4E is diagram illustrating an exemplary directional pattern of an infrared LED.
Figure 7A:
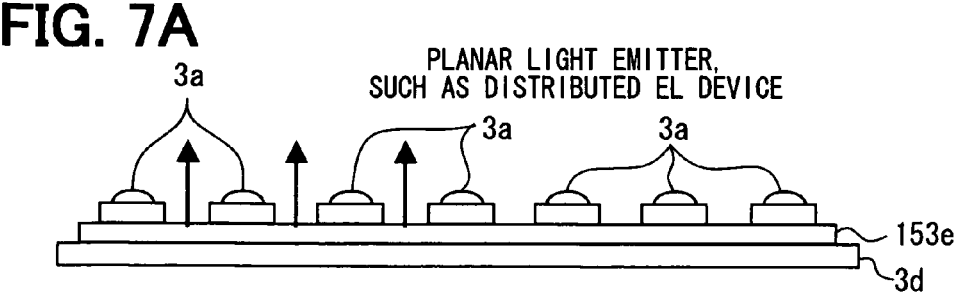
FIG. 7A is a diagram illustrating the disposition of LEDs in a projector in still another exemplary embodiment.
Figure 7B:
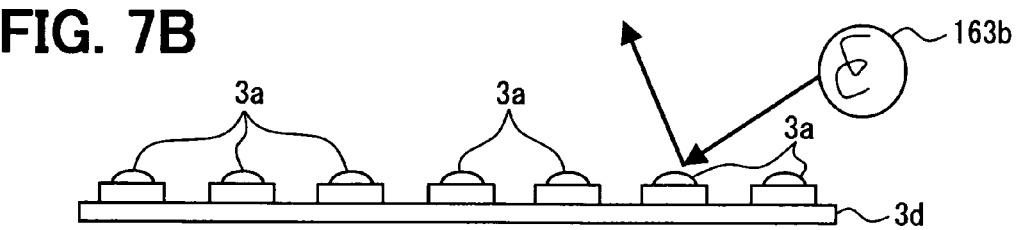
FIG. 7B is a diagram illustrating the disposition of LEDs in a projector in still another exemplary embodiment.
Figure 7C:
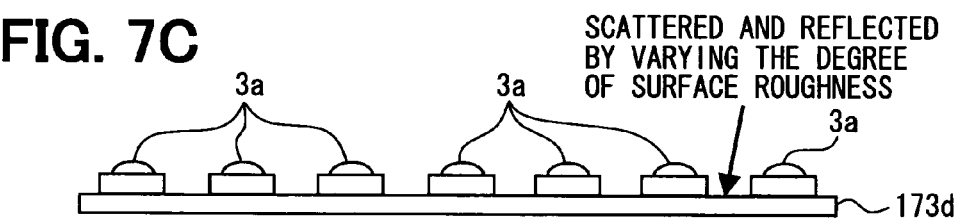
FIG. 7C is a diagram illustrating the disposition of LEDs in a projector in still another exemplary embodiment.
Figure 7D:
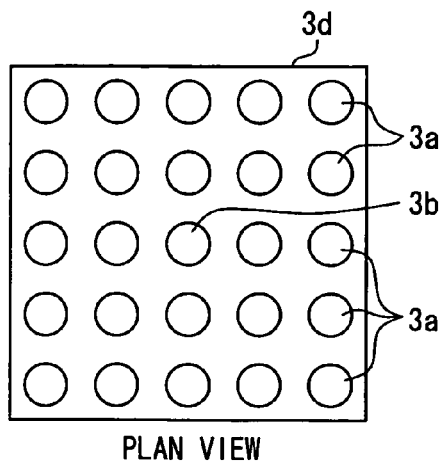
FIG. 7D is a diagram illustrating the disposition of LEDs in a projector in still another exemplary embodiment.

The configuration of the projector 3 as shown in FIG. 4A through FIG. 4E can be described with reference to the disposition of LEDs and various aspects associated therewith. The projector 3 is constructed of near-infrared LEDs 3a and a tinge of red reduction LED 3b so as to project light mostly in a near-infrared wavelength toward the face of a driver. As illustrated in FIG. 4A, FIG. 4B, and FIG. 7D, the projector 3 is constructed in a manner such that multiple LEDs are regularly arranged in an array configuration on a circuit board 3d. Of these arranged LEDs, the LED positioned substantially in the center of the surface of the circuit board 3d is a tinge of red reduction LED 3b, and the other LEDs are near-infrared LEDs 3a. The projector 3 is installed in the instrument panel in the dashboard with the camera 2, and can be disposed in proximity to the camera 2.

One end of each of the near-infrared LEDs 3a of the projector 3 is connected to a near-infrared LED control circuit 4a to be described in greater detail hereinafter, and the other end is grounded through a resistor. Similarly, one end of the tinge of red reduction LED 3b of the projector 3 is connected to a tinge of red reduction LED control circuit 4b to be described in greater detail hereinafter, and the other end is grounded through a resistor.

It should be noted that when the pitch of LEDs in an array configuration is significantly greater than that of the photoreceptor cells of the human eye at the normally driving position, colors of the LEDs cannot be sufficiently mixed. Therefore, the colors of the near-infrared LEDs 3a and the color of the tinge of red reduction LED 3b are locally viewable independently of each other. With respect to the disposition of the LEDs on the circuit board 3d, therefore, it is required to decrease the pitch of the LEDs in an array configuration as illustrated, for example, in FIG. 4A and FIG. 4B in order to prevent color separation. As for a color mixture, for example with reference to the chromaticity coordinate system in FIG. 4C, when the coordinates of visible light such as red light projected from a near-infrared LED 3a are mixed with fine green color with the same power, the human eye perceives the mixture as yellow corresponding for example to the open circle in the center of the drawing. Accordingly, when colors are imbalanced in power, the color perceived by a human observer is shifted in either direction on the straight line between red and green. Therefore, in order to reduce the red color, it is more effective to choose a color for the tinge of red reduction LED 3b by moving away from the red color of the near-infrared LED 3a in the illustrated color coordinate system. In other words, in order to reduce the red color, it is effective to move the blank circle in FIG. 4C away from the red circle on the right side in FIG. 4C along the straight line between red and green on the coordinates of the color.

In addition, in order to reduce red color, it is further effective to constantly set the power of the color of the tinge of red reduction LED 3b stronger. However, for example, when the tinge of red reduction LED 3b used is of white color positioned in the center of the chromaticity coordinate system, it is advisable to set the white color even stronger as long as the driver does not perceive the setting as too bright. It should be noted however that relative visibility for color varies between individuals, and therefore it cannot be categorically established as a predetermined numeric value such as a constant. Accordingly, a measure may be taken so that the driver can adjust the state of color mixture by a selector.

The projector 3 can be further configured to be turned on when a current is supplied from the LED control circuit 4. The projector 3 is controlled by a control circuit (not shown) that can be turned on in conjunction with the shutter of the camera 2. For example, if the camera 2 acquires 30 image frames of a scene per second, the projector 3 is turned on 30 times per second. Therefore, the projector 3 is turned on with a timing corresponding to the acquisition by the camera 2 of one image frame. That is, the projector 3 is so constructed that the when the shutter of the camera 2 is opened, projection is started and when the shutter of the camera 2 is closed, projection is terminated.

The LED control circuit 4 controls the control value through the projector 3. The LED control circuit 4 is constructed of the near-infrared LED control circuit 4a, which controls the control value through each of the near-infrared LEDs 3a, and the tinge of red reduction LED control circuit 4b for controlling the control value through the tinge of red reduction LED 3b of the projector 3. The LED control circuit 4 is mounted in a vehicle and is constructed such that the value set for the control value supplied to the projector 3 can be changed among multiple control values that are different in magnitude. It should be noted that the multiple control values are set according to the functions of the image processing circuit 5. In the present embodiment, control is carried out so that a control value is appropriately changed between when personal identification by using facial recognition is carried out and when closed eye detection is carried out.

The LED control circuit 4 is configured to change the setting of a control value to the projector 3 and to change and finely adjust the lighting illuminance of the projector 3, respectively when it receives a corresponding instruction signal from the image processing circuit 5.

Fine adjustment is carried out when the camera 2 acquires a facial image. If a feedback value of the brightness of a facial image acquired by the camera 2 gets out of a predetermined range, adjustment is carried out. Fine adjustment is carried out only when the brightness of a facial image is too low or too high and is different from the above-mentioned changing of a set control value according to personal identification by using facial recognition processing or closed eyes detection processing.

The image processing circuit 5 has functions for carrying out personal authentication processing, closed eyes detection processing, image processing, and image pickup control processing. The image processing circuit 5 is mounted in a vehicle, and mainly includes a digital signal processor (DSP), central processing unit (CPU), a memory, and a voltage conversion circuit.

The DSP receives an actuation instruction signal from the CPU, and processes a facial image inputted from the camera 2 to carry out personal authentication or closed eyes detection. The CPU controls the entire system by outputting an actuation instruction signal to the camera 2, LED control circuit 4, and DSP. In response thereto, the LED control circuit 4 changes a set control value; the camera 2 acquires a facial image of the driver and outputs the facial image to the image processing circuit 5. The DSP alternatively carries out personal authentication or closed eye detection.

The memory temporarily stores facial images inputted from the camera 2. Further, a predetermined amount of a characteristic such as an identifying characteristic of the driver used in personal authentication is previously stored in the memory. In personal authentication, for example, the DSP processes a facial image temporarily stored in the memory to detect an amount of a characteristic, and checks the detected amount of the characteristic against the amount of the characteristic of the driver previously stored in the memory.

The voltage conversion circuit converts a voltage supplied from a battery into a required voltage. A voltage of a required magnitude is supplied from the battery to the camera 2, the LEDs 3, the LED control circuit 4, the CPU and the DSP of the image processing circuit 5, and the like through the voltage conversion circuit.

The image processing circuit 5 is so constructed that the CPU is inputted with an occupant detection signal (not shown) from the weight sensing switch 1. When a door transitions from locked state to unlocked state and a corresponding indicating signal is inputted from a door ECU (not shown), the image processing circuit 5 is brought into a standby state. In addition, the image processing circuit 5 is constructed such that when an occupant detection signal is inputted from the weight sensing switch 1, an actuation instruction signal is outputted from its CPU to the camera 2, LED control circuit 4, and DSP.

Figure 3:
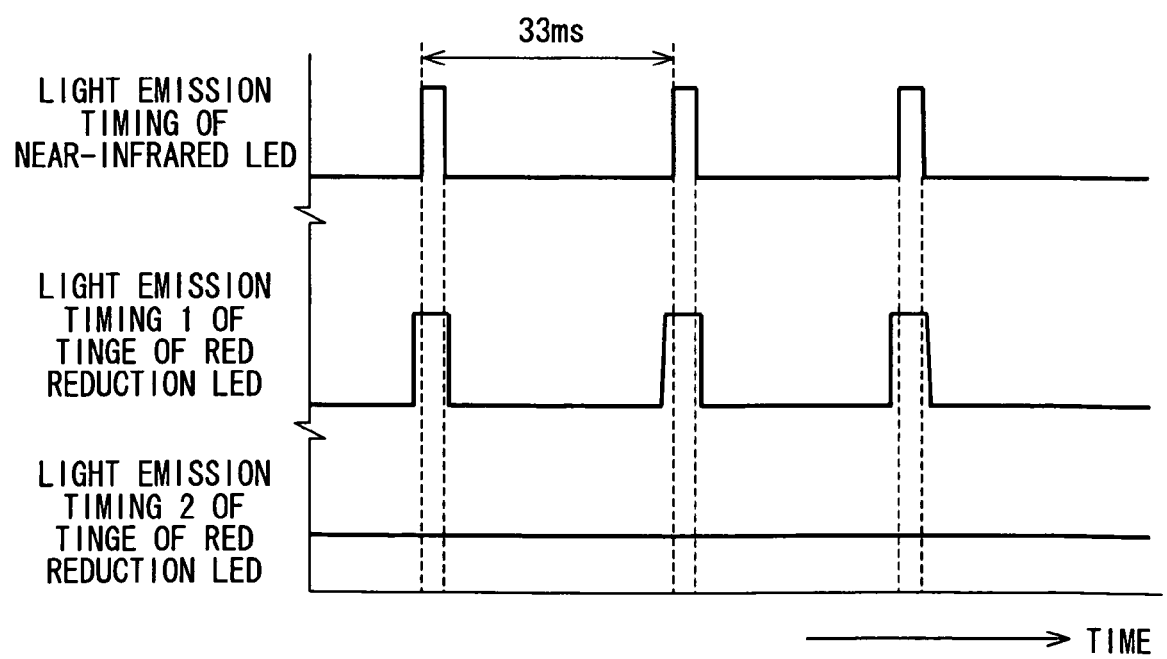
FIG. 3 is timing diagram illustrating timing associated with a near-infrared LED and a tinge of red reduction LED.

FIG. 3 illustrates an example of the light emission patterns of the near-infrared LEDs 3a and the tinge of red reduction LED 3b controlled by the image processing circuit 5. The light emission patterns are capable of being set to a duty for attenuating the visible luminescent color of the near-infrared LEDs 3a. Accordingly, a duty only has to be slightly widened with the frequency unchanged. However, when a driver senses flickering, for example, when the light emission frequency of the near-infrared LEDs 3a is lower than, for example, 30 Hz, the drive frequency for the tinge of red reduction LED 3b should be set higher than that for the near-infrared LEDs 3a. When there is no restriction on power consumption or the lives of LEDs, DC drive is acceptable. However, since it is desirable to actively vary the brightness in response to the environment light, and to therefore not maintain constant brightness, it is preferable to limit control values so as to preserve LED life.

The near-infrared LEDs 3a and the red reduction LED 3b may be operated using a common driver circuit. In this case, the near-infrared LEDs 3a and the red reduction LED 3b may be lit at the same time. It is preferable to alternately light the near-infrared LEDs 3a and the red reduction LED 3b using a switching circuit. In such a structure of alternately lighting, the overall circuit size and complexity can be reduced, and a capacitor of the driver circuit may be reduced in capacity.

Figure 5:
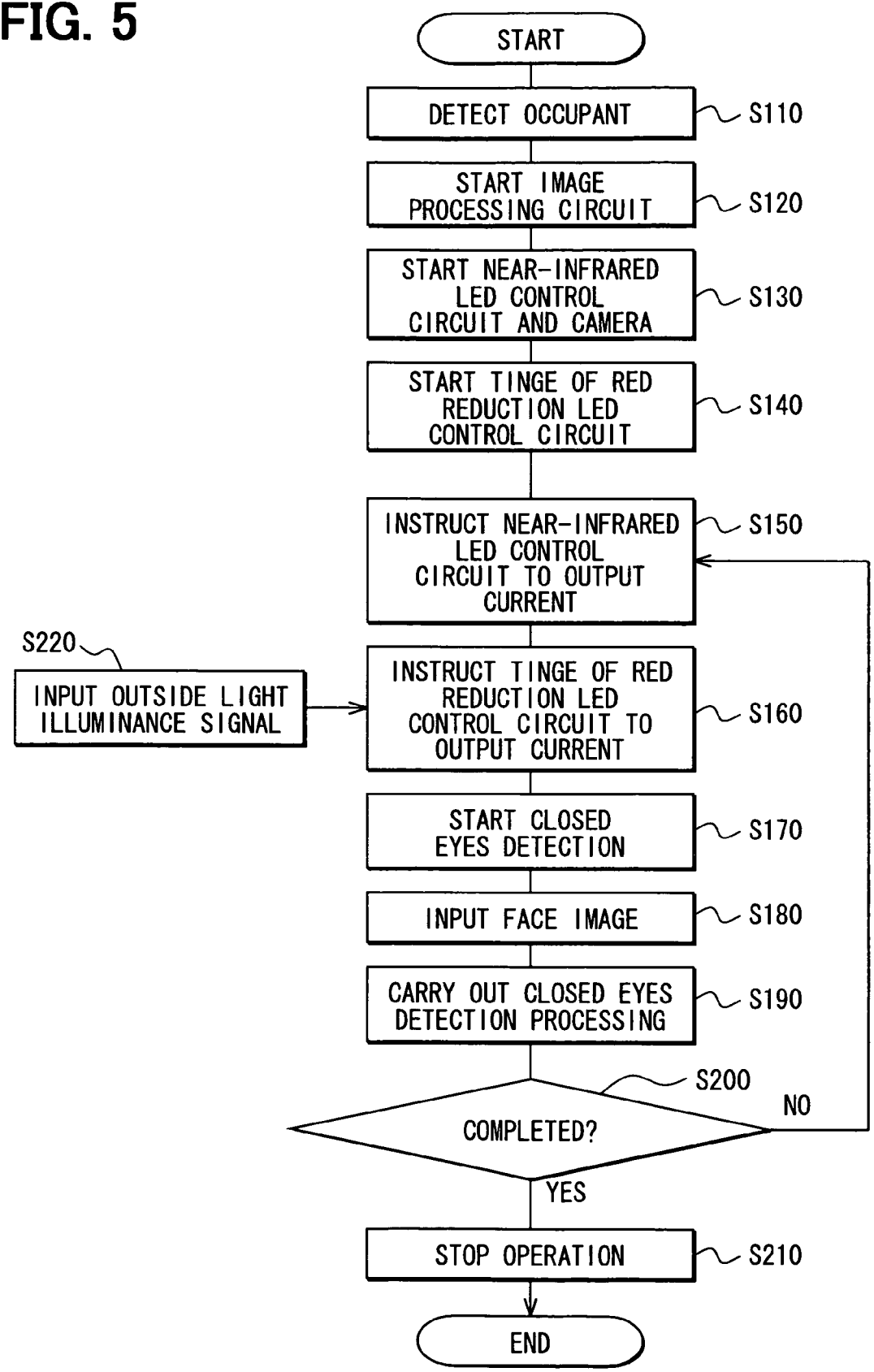
FIG. 5 is a flowchart illustrating an exemplary flow of light emission control processing for controlling light emission from a near-infrared LED and a tinge of red reduction LED.

Description will now be given to light emission control processing carried out by the LED control circuit 4 and the image processing circuit 5 of the image pickup apparatus 100 with reference to the flowchart in FIG. 5. Processing is carried out when the power to the image pickup apparatus 100 is turned on.

First, an occupant such as a driver is detected based on an output signal from the weight sensing switch 1 at S110 and a corresponding indication signal is output to the image processing circuit 5 When the indication signal is received, the image processing circuit 5 is started at S120 in a standby mode. The near-infrared LED control circuit 4a and the camera 2 are then started at S130. Further, the tinge of red reduction LED control circuit 4b is started at S140. The image processing circuit 5 instructs the near-infrared LED control circuit 4a to output voltage to the near-infrared LEDs 3a at S150 and instructs the tinge of red reduction LED control circuit 4b to output voltage to the tinge of red reduction LED 3b at S160. At this time, the image processing circuit 5 carries out control so that the near-infrared LEDs 3a and the tinge of red reduction LED 3b emit light in accordance with the above-mentioned light emission patterns as shown for example in FIG. 3.

The control value supplied to the tinge of red reduction LED 3b when the above described processing at S160 is carried out may be varied according to outside light. Specifically, an illuminance signal indicating the level of outside light or illuminance is output from an illuminance sensor for detecting the outside light illuminance at S220. Based on the illuminance signal, the image processing circuit 5 instructs the tinge of red reduction LED control circuit 4b to output voltage to the tinge of red reduction LED 3b. The illuminance sensor can be constructed of a photodiode, phototransistor, or the like. When the pupils of the driver are sufficiently opened in the daytime or in light environments, for example, the tinge of red reduction LED 3b may be bright. At night or in dark environments, a control value may be controlled so as to prevent the driver from feeling dazzled. Further, since the brightness of instrument cluster illumination and the backlight for the navigator screen can be varied in connection with turning on or off the headlights or brightness adjustment, the current value may be varied in synchronization with instrument cluster illumination. An optical sensor may be mounted in the vehicle for measuring the environment light, which can be estimated through image processing by, for example, comparing an acquired image for image recognition with a control value of a particular camera gain or the like.

Closed eyes detection is started at S170. Specifically, the camera 2 picks up a facial image at S180, and the image processing circuit 5 starts closed eyes detection processing at S190. The image processing circuit 5 determines whether or not the closed eyes detection processing has been completed at S200.

When it is determined that the closed eyes detection processing has not been completed corresponding to NO at S200, execution returns to S150. When it is determined that the closed eyes detection processing has been completed corresponding to YES at S200, the operation of each part is stopped at S210 and processing in connection with the previously described operation is terminated.

In accordance with the effects of the first embodiment and with the image pickup apparatus 100 in the first embodiment, as mentioned above, the projector 3 is constructed as described below. As illustrated in FIG. 4A, FIG. 4B, and FIG. 7D, the projector 3 is constructed such that the multiple LEDs are regularly arranged in an array configuration on the circuit board 3d. Of the arranged LEDs, the LED positioned substantially in the center of the surface of the circuit board 3d is the tinge of red reduction LED 3b and the other LEDs are the near-infrared LEDs 3a. Similarly with the camera 2, the projector 3 is installed in the instrument panel in the dashboard and is disposed in proximity to the camera 2. The projector 3 is controlled by a control circuit (not shown) so that it is turned on in conjunction with the shutter of the camera 2. Thus, the multiple light sources different in wavelength are disposed in the vehicle compartment in such positions that light projected from the multiple light sources are mixed together before they reach an observer such as the eye of the driver. Accordingly, any red color is made invisible preventing a driver who is susceptible to red color from being confused. Therefore, it is possible to block the above described distracting light through an inexpensive construction without blocking light in a required range of wavelengths.

In the image pickup apparatus 100 in the first embodiment, the projector 3 is so constructed that the multiple LEDs are regularly arranged in an array configuration on the circuit board 3d. Of the arranged LEDs, the LED positioned substantially in the center of the surface of the circuit board 3d is the tinge of red reduction LED 3b and the other LEDs are the near-infrared LEDs 3a. That is, the light sources of two different wavelengths provided in the projector 3 are so constructed that the light source of one wavelength can project light containing visible red light bringing about the following advantage. When visible light such as red light is applied, the driver has a feeling of tension arising from awareness of monitoring. When only invisible light is applied, the driver is not aware of monitoring contributing preventive safety.

In the image pickup apparatus 100 in the first embodiment, the projector 3 is disposed in the instrument panel in the dashboard of a vehicle. Accordingly, light is projected from each light source onto the eyes and face of the driver from the front of the driver.

In the image pickup apparatus 100 in the first embodiment, the image processing circuit 5 controls the amount of light emitted through the projector 3 through the LED control circuit 4. Accordingly, the output of each light source is appropriately controlled.

In the image pickup apparatus 100 in the first embodiment, the image processing circuit 5 performs the following operation based on an output signal, indicating the outside light illuminance, generated or otherwise output from an illuminance sensor. The output signal instructs the tinge of red reduction LED control circuit 4b to output current to the tinge of red reduction LED 3b. Accordingly, the output of each light source is appropriately controlled even when the illuminance of each light source felt by the driver varies depending on the outside light illuminance.

In the image pickup apparatus 100 in the first embodiment, the image processing circuit 5 controls the control value through the LEDs on an LED-by-LED basis bringing about the following advantage. When light of different wavelengths simultaneously reaches and observer, the observer becomes more vividly aware of the color of light whose output is more intense, and pays less attention to the color of light whose output is weaker.

In the image pickup apparatus 100 in the first embodiment, setting can be made as follows. When the driver senses flickering, for example, when the light emission frequency of the near-infrared LEDs 3a is lower than, for example, 30 Hz, the drive frequency for the tinge of red reduction LED 3b is set higher than that for the near-infrared LEDs 3a. As mentioned above, control is carried out so that the amount of light emission of one light source at startup is higher than the amount of light emission of the other light source at startup.

Other Embodiments

The invention has been described herein in connection with various exemplary embodiments. However, the invention is not strictly limited thereto. The invention can be embodied in various modes as described in greater detail hereinbelow.

For example, in accordance with the above described embodiments, the projector 3 includes the tinge of red reduction LED 3b. However, the projector 3 need not include an LED. Instead, projector 3 may include, for example, an EL device in the form of planar light emitter, an electric light bulb or the like. Alternatively, the invention may be so constructed that environment light is reflected. Accordingly a more appropriate combination of LEDs and an electric light bulb can be selected with the frequency characteristics of the LEDs and the electric light bulb taken into account.

The luminescent color of the tinge of red reduction LED 3b need not be white or green and may be any other color. That is, the only requirement is for the color to be a certain distance from red color in the color temperature or chromaticity coordinate system. The selection of the color should considered such that it will not be confused with a color indicating danger or color having specific meaning in the vehicle compartment such as an amber emergency color or the like.

As will be appreciated, it is advisable to compensate for color change that occurs over time due to differences in the useful life between LEDs by controlling an applied current control value by the image processing circuit 5 such that a hue is a made to look unchanged. Thus, even when the output level of each light source has been varied due to systematic change in the projector, the output of each light source can be appropriately controlled.

The current-brightness characteristics of the two different types of LEDs are varied by temperature. Therefore, an ambient temperature value may be fed back to change a control value by the image processing circuit 5. Thus, even when the output level of each light source has been varied depending on ambient temperature, the output of each light source can be appropriately controlled.

It should be noted that the degree to which a tinge of red is sensed varies between individuals. Therefore, a measure may be taken so that the color can be adjusted to the individual taste of the driver. Specifically, an input value from the driver is fed back, and the image processing circuit 5 varies a control value accordingly, enhance the convenience of the driver.

It should also be noted that the color can be adjusted according to the biological condition of the driver. Specifically, information about the biological condition of the driver is acquired and fed back, and the image processing circuit 5 varies a control value according to the conditions of the vehicle's driver and thereby adjusts the state of color mixture. Further, it is possible to alert the driver by change in the state of color mixture. Accordingly, a condition of the driver, such as a wakefulness condition, that is difficult for the driver to become aware of, is brought to the attention of the driver.

When the image processing circuit 5 varies the control value, such as a current value, through the near-infrared LEDs 3a, the control value through the tinge of red reduction LED 3b may also be accordingly varied.

In the image pickup apparatus 100 in accordance with the above described embodiment, when the driver senses flickering, for example, when the light emission frequency of the near-infrared LEDs 3a is lower than, for example, 30 Hz, the drive frequency for the tinge of red reduction LED 3b is set higher than that for the near-infrared LEDs 3a. However, in accordance with alternative embodiments, the drive frequency for the tinge of red reduction LED 3b may be set higher than that for the near-infrared LEDs 3 at any time before or after operation regardless of whether the driver senses flickering.

As mentioned above, control is carried out so that the amount of light emission of one light source at startup is higher than the amount of light emission of the other light source at startup. When light simultaneously reach a human's eyes, he/she becomes more vividly aware of the color of light whose output is more intense than that of the other. Therefore, the above construction can make him/her pay less attention to the color of light whose output is weaker than that of the other from the early stages immediately after startup.

A reflecting member capable of reflecting light may be disposed in the light path projected from the near-infrared LEDs 3a or the tinge of red reduction LED 3b. Accordingly, the degree of freedom in location of the light source can be enhanced. In addition, the reflecting member is capable of selectively reflecting and absorbing a specific component of wavelength of the light projected from the light source, whereas red component can be reduced from the light projected to the driver. Similarly, red component can be reduced from natural light by selectively reflecting and absorbing specific component of wavelength of the light by using the reflecting member.

In the image pickup apparatus 100 in the above described embodiment, as illustrated for example, in FIG. 4A, FIG. 4B, and FIG. 7D, the projector 3 is so constructed that the multiple LEDs are regularly arranged in an array configuration on the circuit board 3d. Specifically, of the arranged LEDs, the LED positioned substantially in the center of the surface of the circuit board 3d is the tinge of red reduction LED 3b and the other LEDs are the near-infrared LEDs 3a. It should be noted that the invention is not limited to the above described construction. Rather, the projector 3 may be variously constructed as described in greater detail below.

Figure 6A:
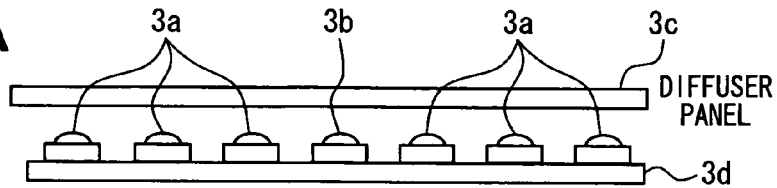
FIG. 6A is a diagram illustrating the disposition of LEDs in a projector in one exemplary embodiment.

For example, as illustrated in FIG. 6A, a diffuser panel 3c may be disposed in the projector 3 in the direction in which the near-infrared LEDs 3a and the tinge of red reduction LED 3b project light such that the projected light is diffused.

Figure 6B:
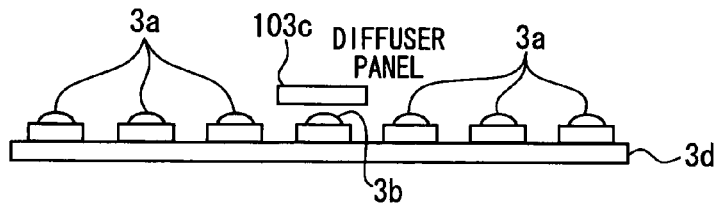
FIG. 6B is a diagram illustrating the disposition of LEDs in a projector in another exemplary embodiment.

As illustrated in FIG. 6B as an example, a diffuser panel 103c is disposed in the projector 3 in the direction in which the tinge of red reduction LED 3b projects light such that the projected light is diffused.

Figure 6C:
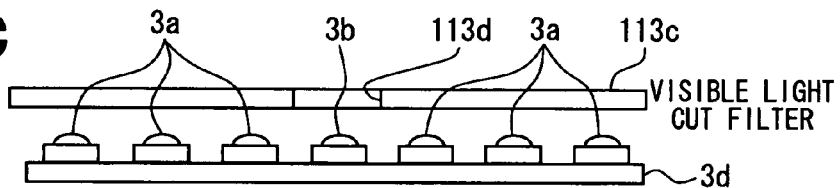
FIG. 6C is a diagram illustrating the disposition of LEDs in a projector in still another exemplary embodiment.

As illustrated in FIG. 6C as an example, a low price visible light cut filter 113c having a window 113d may be disposed in the projector 3 in the direction in which the near-infrared LEDs 3a and the tinge of red reduction LED 3b project light. The visible light projected from the near-infrared LEDs 3a is absorbed or reflected and light projected from the tinge of red reduction LED 3b is let through the window 113d.

Figure 6D:
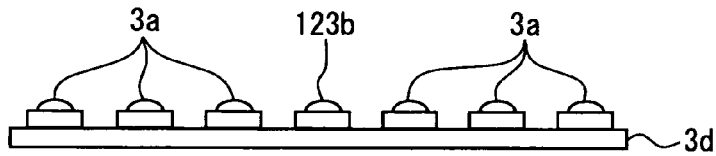
FIG. 6D is a diagram illustrating the disposition of LEDs in-a projector in still another exemplary embodiment.

The projector 3 can be so constructed that the multiple LEDs are regularly arranged in an array configuration on the circuit board 3d. For example, as illustrated in FIG. 6D, an LED 123b emitting light in any color other than white and green may be used for the LED positioned substantially in the center of the surface of the circuit board 3d which is otherwise equipped with near-infrared LEDs 3a.

Figure 6E:
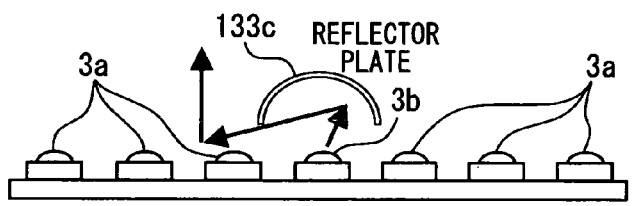
FIG. 6E is a diagram illustrating the disposition of LEDs in a projector in still another exemplary embodiment.

As illustrated in FIG. 6E, an exemplary reflector plate 133c may be disposed in the projector 3 in the direction in which the tinge of red reduction LED 3b projects light. Thus, light projected from the tinge of red reduction LED 3b is reflected toward the circuit board 3d where it is reflected again.

Figure 6F:
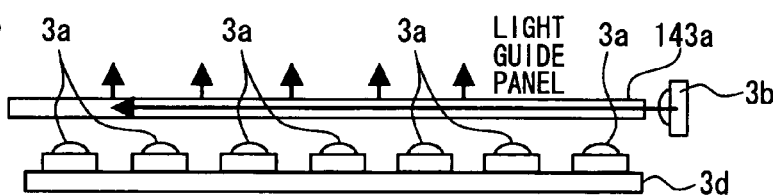
FIG. 6F is a diagram illustrating the disposition of LEDs in a projector in still another exemplary embodiment.

The projector 3 can be so constructed that the multiple LEDs are regularly arranged in an array configuration on the circuit board 3d. As illustrated in FIG. 6F, the near-infrared LEDs 3a are arranged in the array, a light guide panel 143a is disposed in the direction in which the near-infrared LEDs 3a project light, and the tinge of red reduction LED 3b is disposed in proximity to a light guiding port of the light guide panel 143a. Thus, light projected from the tinge of red reduction LED 3b is guided by the light guide panel 143a toward the direction in which the near-infrared LEDs 3a project light.

Figure 6G:
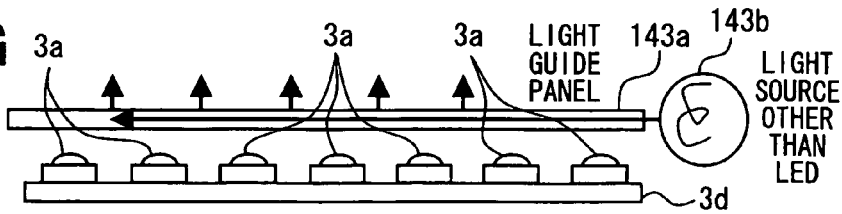
FIG. 6G is a diagram illustrating the disposition of LEDs in a projector in still another exemplary embodiment.

Alternatively, the projector 3 can be so constructed that the multiple LEDs are regularly arranged in an array configuration on the circuit board 3d. As illustrated in FIG. 6G, the near-infrared LEDs 3a can be arranged in an array, a light guide panel 143a is disposed in the direction in which the near-infrared LEDs 3a project light, and a light source 143b, such as an electric light bulb, other than LED, is disposed in proximity to a light guiding port of the light guide panel 143a. Thus, light projected by the light source 143b is guided by the light guide panel 143a toward the direction in which the near-infrared LEDs 3a project light.

The projector 3 can also be so constructed that the multiple LEDs are regularly arranged in an array configuration on the circuit board 3d. As illustrated in FIG. 7A, a planar light emitter 153e, such as a distributed EL device, or the like may be disposed on the surface of the circuit board, and near-infrared LEDs 3a may be used for the arranged LEDs.

The projector 3 is so constructed that the multiple LEDs are regularly arranged in an array configuration on the circuit board 3d. As illustrated in FIG. 7B as example, the near-infrared LEDs 3a are arranged in an array, and a light source 163b, such as an electric light bulb, other than an LED is disposed in proximity to the circuit board 3d. Thus, light projected by the light source 163b is projected onto the circuit board 3d and is reflected by the circuit board 3d.

The projector 3 is so constructed that the multiple LEDs are regularly arranged in an array configuration on the circuit board 173d. As illustrated in FIG. 7C as an example, the near-infrared LEDs 3a are arranged in an array and the surface of the circuit board 173d is roughened. Thus, light projected by the near-infrared LEDs 3a is scattered and reflected by the circuit board 173d. The surface of the circuit board 173d may be formed of a material capable of reflecting and absorbing a specific wavelength of light.

Figure 7E:
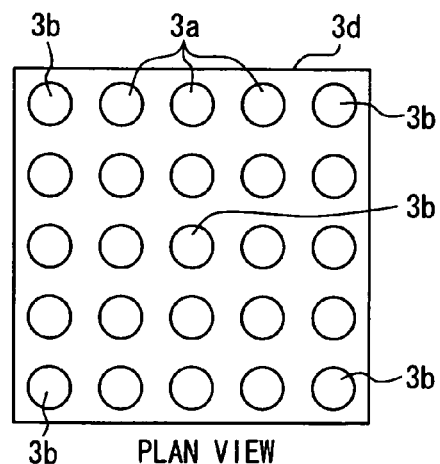
FIG. 7E is a diagram illustrating the disposition of LEDs in a projector in yet another exemplary embodiment.

Still further, the projector 3 is so constructed that the multiple LEDs are regularly arranged in an array configuration on the circuit board 3d. As illustrated in FIG. 7E, the arranged LEDs may be so constructed that tinge of red reduction LEDs 3b are used for the LED positioned substantially in the center of the surface of the circuit board 3d and LEDs positioned at the corners of the surface of the circuit board and near-infrared LEDs 3a are used for the other LEDs.

What is claimed is:

1. A projector comprising:
   a first plurality of light sources of a first wavelength;
   a second light source of a second wavelength,
   wherein the first wavelength and the second wavelength are different;
   wherein the first plurality of light sources and the second light source are disposed in a vehicle compartment in such positions that light of the first wavelength and light of the second wavelength projected therefrom forming a color mixture before reaching an observer;
   a camera for capturing at least a portion of the projected light reflected by a face of a driver of the vehicle; and
   a control means for controlling the first plurality of light sources and the second light source in conjunction with a shutter of the camera;

wherein the control means controls the amount of light emitted through the first plurality of light sources and the second light source based on the condition of a driver on a light source-by-light source basis to thereby adjust the color mixture.

2. The projector according to claim 1, wherein the first plurality of light sources includes light emitting diodes (LED) and the second light source includes a light emitter other than an LED.

3. The projector according to claim 1, wherein the first wavelength includes visible red light.

4. The projector according to claim 1, wherein the first plurality of light sources and the second light source are disposed in an instrument panel of a vehicle.

5. The projector according to claim 1, further comprising a reflecting member disposed in a light path of any of the first plurality of light sources and the second light source.

6. The projector according to claim 1, wherein
the control means controls an amount of light emitted through the first plurality of light sources and the second light source.

7. The projector according to claim 6, wherein the control means controls the amount of light emitted through the first plurality of light sources and the second light source based on an outside light illuminance.

8. The projector according to claim 6, wherein the control means controls the amount of light emitted through the first plurality of light sources and the second light source based on an ambient temperature.

9. The projector according to claim 6, wherein the control means controls the amount of light emitted through the first plurality of light sources and the second light source on a light source-by-light source basis.

10. The projector according to claim 1, wherein the control means controls the first plurality of light sources synchronous with the shutter of the camera.

11. A projector projecting light of a first wavelength and a second wavelength different from the first wavelength, the projector disposed in a vehicle compartment in such a position that a first wavelength and a second wavelength form a color mixture before reaching an observer, the projector comprising:
a first plurality of light sources projecting light of the first wavelength and a second light source projecting light of the second wavelength;
a control means for controlling the amount of light emitted through the first plurality of light sources and the second light source on a light source-by-light source basis,
wherein the first wavelength includes a visible near-infrared wavelength, and
wherein the control means controls the amounts of the currents such an output power of the second light source at startup is higher than the first plurality of light sources;
a camera for capturing at least a portion of the projected light reflected by a face of a driver of the vehicle; and
a control means for controlling the first plurality of light sources and the second light source in conjunction with a shutter of the camera;
wherein the control means controls the amount of light emitted through the first plurality of light sources and the second light source based on the condition of a driver on a light source-by-light source basis to thereby adjust the color mixture.

12. The projector according to claim 11, wherein the control means controls the first plurality of light sources synchronous with the shutter of the camera.

13. A projector projecting light of a first wavelength and a second wavelength different from the first wavelength such that the first wavelength and the second wavelength form a color mixture before reaching an observer, the projector comprising:
a plurality of tight sources disposed in a vehicle compartment projecting the light of the first wavelength and the second wavelength forming the color mixture;
a control means for controlling the amount of light emitted through the plurality of light sources on a light source-by-light source basis,
wherein the first wavelength includes visible near-infrared wavelength and the second wavelength is set to a predetermined output level higher than an output level of the first wavelength at startup, and
wherein the controlling means controls the amount of light emitted through ones of the plurality of light sources associated with the second wavelength based to the predetermined output level;
a camera for capturing at least a portion of the projected light reflected by a face of a driver of the vehicle; and
a control means for controlling the plurality of light sources in conjunction with a shutter of the camera;
wherein the control means controls the amount of light emitted through the first plurality of light sources and the second light source based on the condition of a driver on a light source-by-light source basis to thereby adjust the color mixture.

14. The projector according to claim 13, wherein the control means controls one or more of the plurality of light sources projecting the light of the first wavelength synchronous with the shutter of the camera.

15. A projector projecting light of a first wavelength and a second wavelength different from the first wavelength such that the first wavelength and the second wavelength form a color mixture before reaching an observer, the projector comprising:
a plurality of light sources disposed in a vehicle compartment projecting the light of the first wavelength and the second wavelength forming the color mixture;
a control means for controlling amount of light emitted through the plurality of light sources on a light source-by-light source basis,
wherein the first wavelength includes visible near-infrared wavelength, and
wherein the control means controls the amount of light emitted through ones of the plurality of light sources associated with the second wavelength so as to increase after startup of the projector;
a camera for capturing at least a portion of the projected light reflected by a face of a driver of the vehicle; and
a control means for controlling the plurality of light sources in conjunction with a shutter of the camera;
wherein the control means controls the amount of light emitted through the first plurality of light sources and the second light source based on the condition of a driver on a light source-by-light source basis to thereby adjust the color mixture.

16. The projector according to claim 15, comprising:
an input means to input an amount of change in the amounts of the amount of light emitted through the plurality of light sources on a light source-by-light source basis, wherein the control means adjusts the amounts of the amount of light emitted based on the amount of change input by the input means.

17. The projector according to claim 16, wherein the control means controls the amount of light emitted so as to turn on and off the plurality of light sources in conjunction with the shutter of the camera.

18. The projector according to claim 15, wherein the control means controls one or more of the plurality of light sources projecting the light of the first wavelength synchronous with the shutter of the camera.

* * * * *